United States Patent
Sitbon et al.

(10) Patent No.: US 12,177,122 B2
(45) Date of Patent: Dec. 24, 2024

(54) END SYSTEM FOR AN AVIONICS COMMUNICATION SYSTEM AND ASSOCIATED AVIONICS COMMUNICATION SYSTEM

(71) Applicant: THALES, Courbevoie (FR)

(72) Inventors: Arnaud Sitbon, Mérignac (FR); Yves Finaz, Mérignac (FR)

(73) Assignee: THALES, Courbevoie (FR)

( * ) Notice: Subject to any disclaimer, the term of this patent is extended or adjusted under 35 U.S.C. 154(b) by 338 days.

(21) Appl. No.: 17/570,590

(22) Filed: Jan. 7, 2022

(65) Prior Publication Data

US 2022/0224645 A1   Jul. 14, 2022

(30) Foreign Application Priority Data

Jan. 8, 2021   (FR) .................................... 21 00167

(51) Int. Cl.
*H04L 45/745* (2022.01)
*H04L 67/12* (2022.01)

(52) U.S. Cl.
CPC ............ *H04L 45/745* (2013.01); *H04L 67/12* (2013.01)

(58) Field of Classification Search
CPC .............................. H04L 45/745; H04L 67/12
See application file for complete search history.

(56) References Cited

U.S. PATENT DOCUMENTS

| | | | | |
|---|---|---|---|---|
| 9,494,933 | B1* | 11/2016 | Jackson | H04L 69/40 |
| 10,187,365 | B2* | 1/2019 | Toillon | H04L 1/22 |
| 10,454,656 | B1* | 10/2019 | Nelson | H04L 12/18 |
| 10,887,244 | B1* | 1/2021 | DeLay | H04L 47/6275 |
| 10,917,355 | B1* | 2/2021 | DeLay | H04L 49/3045 |
| 11,388,267 | B2* | 7/2022 | Fitterer | H04L 69/22 |
| 2006/0062143 | A1* | 3/2006 | Bibby | G06F 11/2005 370/225 |
| 2011/0103268 | A1* | 5/2011 | Mann | H04L 12/4625 370/276 |
| 2013/0156427 | A1* | 6/2013 | Lopez | H04J 14/025 398/52 |
| 2015/0003286 | A1* | 1/2015 | Toillon | H04L 41/12 370/254 |
| 2015/0081759 | A1* | 3/2015 | Taillon | G06F 9/5072 709/201 |

(Continued)

FOREIGN PATENT DOCUMENTS

EP   3 076 605 A1   10/2016

OTHER PUBLICATIONS

French Search Report, from the French Patent Office in counterpart French Application No. 2100167, dated Aug. 4, 2021.

*Primary Examiner* — Alex Skripnikov
(74) *Attorney, Agent, or Firm* — ArentFox Schiff LLP (57) ABSTRACT

The present invention relates to an end system comprising at least one input port adapted to receive frames, and a configuration table comprising, for each identification value, a received frame of parameters for processing that frame.

The end system is adapted to determine a processing protocol between an ARINC 664 P7 type protocol and an IEEE 802 type protocol of each frame received via the input port exclusively from the processing parameters corresponding to the identification value of that frame in the configuration table, independently of the type of this frame.

9 Claims, 6 Drawing Sheets

(56) References Cited

U.S. PATENT DOCUMENTS

| | | | |
|---|---|---|---|
| 2015/0103735 A1* | 4/2015 | Bobrek | H04L 47/10 370/316 |
| 2016/0173472 A1* | 6/2016 | Toillon | H04L 67/12 726/5 |
| 2016/0294697 A1* | 10/2016 | Varadarajan | H04L 47/12 |
| 2016/0294720 A1* | 10/2016 | Varadarajan | H04L 47/58 |
| 2017/0295034 A1* | 10/2017 | Saint-Etienne | H04L 12/4625 |
| 2019/0385057 A1* | 12/2019 | Litichever | H04L 63/14 |
| 2020/0213247 A1 | 7/2020 | Fitterer et al. | |
| 2020/0213425 A1* | 7/2020 | Fitterer | H04L 49/351 |
| 2021/0067417 A1* | 3/2021 | DeLay | G06N 3/08 |
| 2022/0200919 A1* | 6/2022 | DeLay | H04L 47/52 |
| 2022/0200931 A1* | 6/2022 | DeLay | H04L 47/28 |

* cited by examiner

| ETH. ENCAPSULATION | | MAC HEADER | | | PAYLOAD | SN | ETH. ENCAP. |
|---|---|---|---|---|---|---|---|
| 7B | 1B | 6B | 6B | 2B | DATA | 1B | 4B |
| PREAMBLE | SFD | MAC DEST | MAC SOURCE | ETHER TYPE | Padding (optional) | SN (A664P7) | FCS |

↗ 15

| ETH. ENCAPSULATION | | MAC HEADER | | | PAYLOAD | ETH. ENCAP. |
|---|---|---|---|---|---|---|
| 7B | 1B | 6B | 6B | 2B | DATA | 4B |
| PREAMBLE | SFD | MAC DEST | MAC SOURCE | ETHER TYPE | Padding (optional) | FCS |

FIG.6

END SYSTEM FOR AN AVIONICS COMMUNICATION SYSTEM AND ASSOCIATED AVIONICS COMMUNICATION SYSTEM

CROSS-REFERENCE TO RELATED APPLICATIONS

This application claims priority to French Application No. 21 00167, filed on Jan. 8, 2021. The disclosure of the priority application is incorporated in its entirety herein by reference.

FIELD OF THE INVENTION

The present invention relates to an end system for an avionics communication system.

The present invention also concerns an avionics communication system associated with this end system.

In particular, the invention enables the implementation of a mixed avionics network transmitting frames compliant with the ARINC 664 P7 type protocol and with an IEEE 802 type protocol different to this ARINC 664 P7 protocol.

BACKGROUND OF THE INVENTION

As is well known, the ARINC 664 standard allows for the implementation of avionics computer networks. Derived from the Ethernet standard, it enables, in particular, the adaptation of this standard to the avionics context and in particular, to avionics constraints. It should be noted that the A664 standard, due to adaptations, is incompatible with the IEEE 802.3 Ethernet standard.

The ARINC 664 standard is composed of several parts, such as: a part dedicated to system concepts, a part dedicated to the physical layer, a part dedicated to services and protocol (IP).

Among these parts, the part referred to as "P7" and generally referred to as "ARINC 664 P7" or "ARINC 664 Part 7" or "AFDX®" is well known.

This P7 part can be used to transmit avionics data between different avionics systems implementing essential aircraft functions, and thus has the highest number of constraints.

Thus, an avionics network implemented according to part P7 potentially has a segregated, redundant and deterministic network. In particular, the determinism of this network means that each frame transmitted reaches its destination in a known maximum time. In particular, segregation means that one or more subscribers who do not meet the time constraints of the A664 P7 standard cannot disrupt the proper functioning of the network.

In some avionics networks, it is also possible to use one or more protocols from the IEEE 802 family. As is well known, this family particularly includes the Ethernet 802.3 protocol or the IEEE 802.11 Wi-Fi protocol.

The A664 P7 standard was created to enable the use of a data network in a critical environment. In particular, it allows for the segregation of data flows with very low granularity, which is not possible with the IEEE 802 family of protocols.

In the avionics world, the Ethernet protocol can also be used to transfer data which may be, for example, maintenance data, download data, passenger entertainment data and/or crew service functions relating to different avionics systems. This means that if this data is lost, it can be re-transmitted without creating a safety risk for the aircraft.

Typically in an aircraft, the ARINC 664 P7 and IEEE 802 networks are segregated from each other. This segregation is achieved by using different physical means to implement these networks.

In particular, this means that to ensure this segregation, these networks use physically different switches and transmission media.

It is therefore conceivable that this type of segregation implies at least a doubling of each physical component implementing these networks. This then implies many problems in terms of space, power consumption and weight in a structure hosting these networks, such as an aircraft.

In the state of the art, some examples of so-called mixed networks are already known, i.e. networks of both ARINC 664 P7 and IEEE 802 type.

Thus, for example, the applicant's application FR 18 74166 discloses a mixed avionics system implementing mixability of the ARINC 664 P7 and Ethernet protocols with predetermined routing.

In particular, such a system comprises switches which are adapted to determine, on receipt of each frame, the protocol of the frame and thus to process this frame in accordance with the determined protocol.

The system described in the above document also includes equipment, also known as "End System" in English or "Système d'extrémité" in French. Like switches, end systems must be adapted to handle mixed flows. However, the functioning of these end systems is not always optimal.

SUMMARY OF THE INVENTION

The present invention is intended to optimise the operation of the end systems of a mixed avionics system.

To this end, the invention relates to an end system for an avionics communication system, the avionics communication system also comprising a plurality of switches connected together to form one or more computer networks, the end system being configured to be connected to at least one of the switches to receive and/or transmit digital data in the form of frames through this switch;

Each frame having an identification field and being of a first type or a second type, the identification field of each frame defining an identification value, the frames of the first type conforming to a protocol of the ARINC 664 P7 type and the frames of the second type conforming to a protocol of the IEEE 802 type, the set of frames of the first type having the same identification value forming a single flow of the first type and the set of frames of the second type having the same identification value forming a single flow of the second type;

The end system being characterised in that it comprises at least one input port capable of receiving frames, and a configuration table comprising, for each identification value, parameters for processing frames that have this identification value; and In that it is able to determine a processing protocol for each frame received via the input port exclusively from the processing parameters corresponding to the identification value of this frame in the configuration table, independently of the type of this frame.

In other beneficial aspects of the invention, the end system comprises one or more of the following features, taken in isolation or in any technically possible combination:

The identification value is a destination address of the frame;

The identification field of each frame corresponds to the MAC DEST field of this frame;

The set of frame identification values of each type and the corresponding processing parameters are statically determined in the configuration table;

For each identification value, the processing parameters include a parameter indicating the need for redundancy management of each frame with has this identification value;

At least one output port capable of transmitting frames of the first type and/or the second type;

The system is configured to transmit each frame of the second type at a timing period predefined by the identification value of this frame;

Each timing period is defined by the processing parameters associated with the corresponding identification value;

The system is configured to transmit each second type frame by filling the available bandwidth after the transmission of the corresponding first type frames.

The present invention also relates to an avionics communication system comprising at least two end systems as defined above and at least one switch connected to each of the end systems.

BRIEF DESCRIPTION OF THE DRAWINGS

These characteristics and advantages of the invention will become apparent upon reading the following description, given only as a non-limiting example, referring to the attached drawings, in which.

In everything that follows, any mention of a norm or standard, in particular an IT standard, refers to the general principles of this norm, which are well known to the person skilled in the field and which are independent of different versions of this norm, unless explicitly stated.

DETAILED DESCRIPTION OF THE INVENTION

Figure 1:
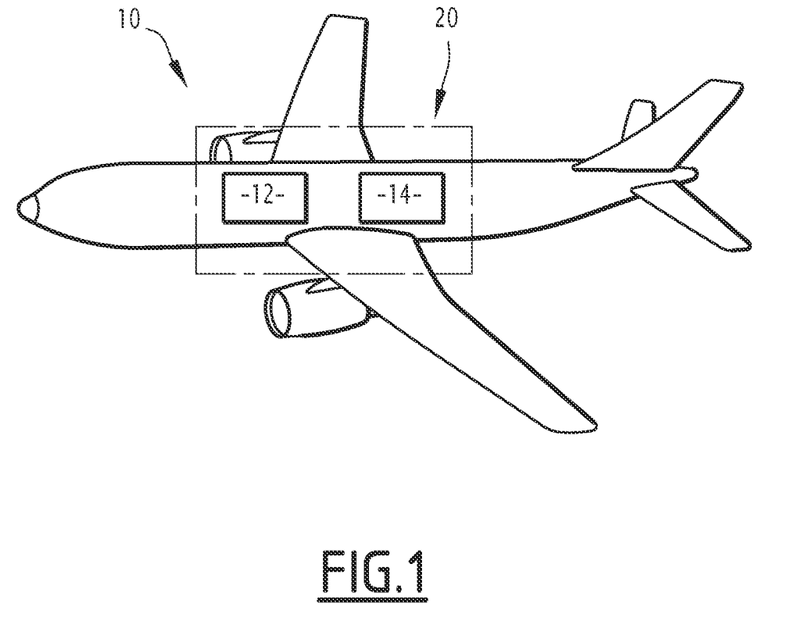
FIG. 1 is a schematic view of an aircraft with an ARINC 664 P7 avionics network and an IEEE 802 avionics network.

FIG. 1 shows an aircraft 10, such as a plane.

Aircraft 10 comprises a 12 ARINC 664 P7 avionics network and a 14 IEEE 802 avionics network.

The 12 avionics network allows sensitive data to be transmitted between different avionics systems. Sensitive data includes any data whose loss or delay in transmission may affect the safety of the aircraft 10.

The 14 avionics network allows less sensitive data to be transmitted compared to the 12 avionics network. Thus, for example, this data corresponds to maintenance data exchanged between the aircraft 10 and the ground and/or functional data exchanged with the crew and/or passenger entertainment data and/or any other type of data.

The digital data flowing through the two networks 12 and 14 are respectively in the form of first type frames and second type frames.

Thus, the first frame type conforms to the ARINC 664 P7 type protocol and the second frame type conforms to the IEEE 802 type protocol.

In particular, "IEEE 802-type protocol" means one of the protocols of the IEEE 802 family of protocols. Such a protocol is, for example, the Ethernet 802.3 protocol or one of the 802.1xxx protocols, i.e. the IEEE 802.11 Wi-Fi protocol, the 802.1Q protocol or the MilStd 1553 protocol.

Figure 3:
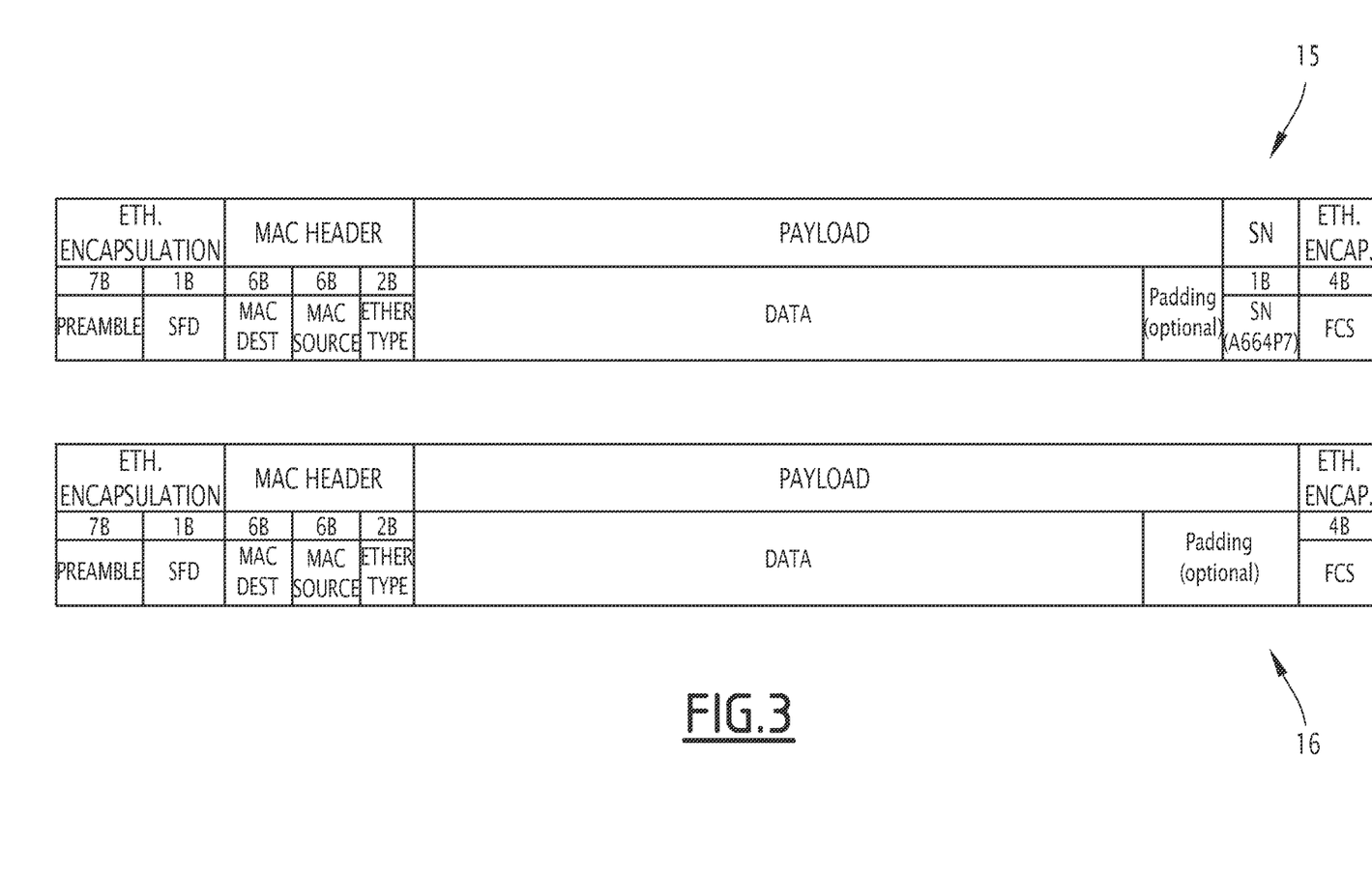
FIG. 3 is a schematic view of the frames sent by the communication system in FIG. 2.

An example of each type of frame is illustrated in FIG. 3. In particular, with reference to this figure, the example of a first type frame is designated by the numerical reference "15" and the example of a second type frame is designated by the numerical reference "16".

Each frame transmitted in the corresponding network 12, 14 includes an identification field.

In the example described, this identification field is included in a header of the frame and forms, for example, a field called "MAC DEST". In FIG. 3, the header is denoted by the reference "MAC HEADER".

As is well known, the MAC DEST field designates the MAC address of the recipient equipment of the corresponding frame.

Each identification field takes on an identification value which, in the example described, corresponds to the MAC address of the equipment receiving the corresponding frame. In other words, the identification value defines a virtual link (also called VL) in the case of ARINC 664 P7 type protocol frames.

In other embodiments, the identification field is formed by any other field in the frame header, such as the MAC SOURCE field designating the MAC address of the equipment transmitting the corresponding frame.

In yet other embodiments, the identification field is formed by at least part of the payload field of the frame.

In general, the frame identification field should be understood as any field in the frame that allows the determination of the switching rules for said frame within a given switch, as will be explained later.

The set of first type frames with the same identification value form a single first type flow and the set of second type frames with the same identification value form a single second type flow.

In other words, each flow of each type is formed by all the frames with the same identification value. Thus, the identification field of each frame also presents an identifier of the flow to which that frame is associated.

According to the invention, avionics networks 12 and 14 are implemented by a single physical avionics communication system 20.

Figure 2:
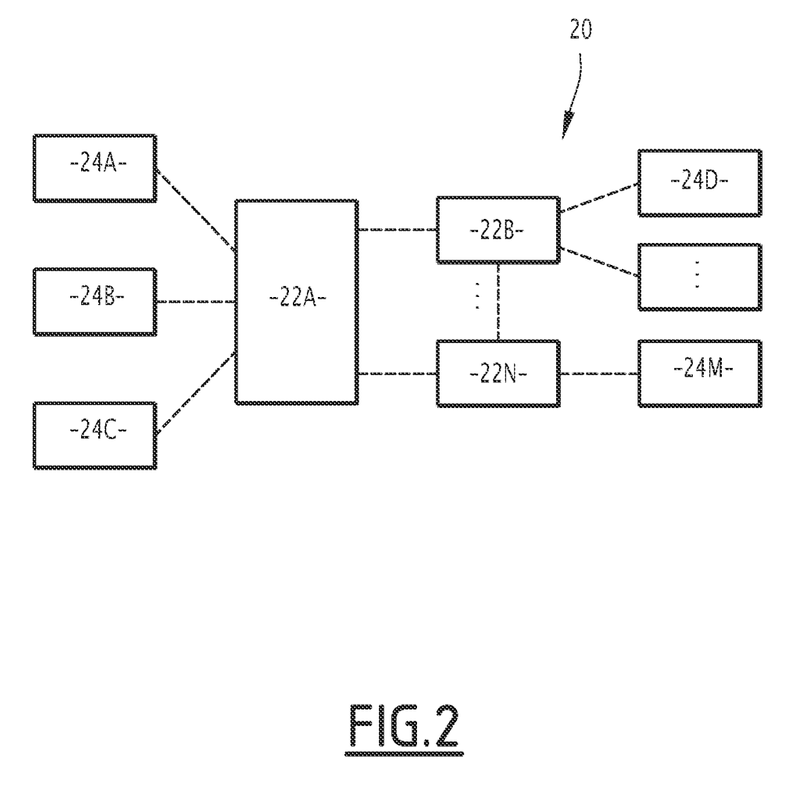
FIG. 2 is a schematic view of a communication system according to the invention, with the communication system implementing the avionics networks in FIG. 1.

An example of such an avionics communication system 20 is shown in FIG. 2.

Thus, with reference to this figure, this communication system 20 comprises a plurality of switches 22A, . . . , 22N and a plurality of end systems 24A, . . . , 24M. The number of these different components and the way in which they are interconnected may, of course, vary according to the examples.

Switches 22A, . . . , 22N are connected to each other by transmission means which also have, for example, a twisted pair cable or any other type of cable allowing bi-directional data transmission or wireless links transmitting digital data via radio waves.

Switches 22A, . . . , 22N are, for example, substantially similar to each other. Thus, in the example described, each switch 22A, ..., 22N is adapted to receive each frame via an input port to transmit it via an output port. For this purpose, upon receipt of each frame, each switch 22A, ..., 22N is, for example, able to determine the type of this frame and to transmit it to a corresponding output port. According to another embodiment, upon receipt of each frame, each switch 22A, ..., 22N is adapted to determine the identification value of that frame and to determine the corresponding output port from this value. In this case, each switch 22A, ..., 22N is, for example, adapted to store a configuration table comprising, for each identification value, switching rules for frames that have this identification value. In all cases, each switch 22A, ..., 22N is adapted to transmit each frame of the first type in priority to each frame of the second type.

According to various embodiments, each switch 22A, ..., 22N is also adapted to apply at least one filtering operation to each first type frame, and in some examples to each second type frame. This filtering operation may include controlling a timing period of frames with the same identification value, controlling the size of packets transmitted by the frames, controlling the lifetime of frames, etc.

Each end system 24A, ..., 24M, also known as "End System" or simply "equipment", is integrated in an avionics system and provides communication of this system with networks 12 and 14.

Thus, depending on the avionics system in which it is integrated, each end system 24A, ..., 24M may be a transmitter and/or receiver of digital data.

Furthermore, at least some of the end systems 24A, ..., 24M may belong only to network 12 or only to network 14. In this case, such an end system is able to transmit and/or receive digital data only from this network. At least some of the other end systems 24A, ..., 24M may belong to both network 12 and network 14 insofar as they are able to transmit and/or receive digital data from both networks.

Each end system 24A, ..., 24M is connected to at least one of the switches 22A, ... 22N via transmission means and via at least one port of this switch. The transmission means include, for example, a twisted-pair cable or any other type of cable allowing bi-directional data transmission or wireless links transmitting digital data via radio waves.

As with the end systems 24A, ..., 24M, each transmission medium may belong to only one of the networks 12 and 14, or to both networks 12 and 14. This depends, in particular, on the nature of the end system 24A, ..., 24M which the corresponding transmission means connects to the corresponding network.

Within the corresponding 12, 14 network, each end system 24A, ..., 24M is identified by its MAC address. In particular, in the case of the ARINC 664 P7 type 12 network, several MAC addresses can be associated with the same end system 24A, ..., 24M. Each of these addresses corresponds to a virtual link leading to this end system 24A, ..., 24N.

In the case of the IEEE 802 14 network, for example, only one MAC address ("unicast" address) is generally associated with each corresponding end system. There are also "multicast" and "broadcast" MAC addresses that an end system must be able to receive.

Thus, when the same end system belongs to both networks 12 and 14, it can be associated with one MAC address ("unicast") for network 14 and one or more MAC addresses for network 12.

Hereafter, the structure of the end system 24A will be described in detail with reference to FIG. 4. It will be further considered that this end system 24A belongs to both networks 12 and 14, and is capable of transmitting frames into these networks and receiving frames from these networks. The structure of the other end systems 24B, ..., 24M is similar to this one, with obvious adaptations depending on the nature of the system.

Figure 4:
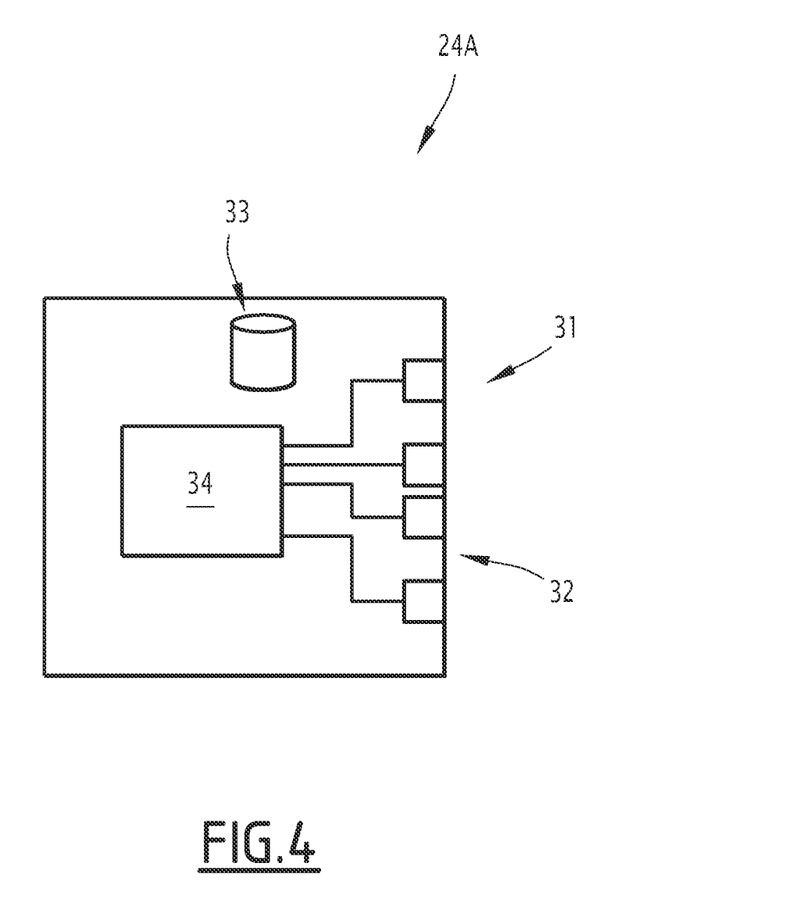
FIG. 4 is a schematic view of an end system that is part of the communication system in FIG. 2.

Thus, with reference to FIG. 4, the end system 24A comprises a plurality of input ports 31, a plurality of output ports 32, a configuration table 33 and control means 34. It should be noted that in this figure, only the external ports, i.e. the ports connecting the system 24A to the networks 12 and 14, are shown. Any internal ports or links connecting this 24A end system to the various components (applications) of the avionics system in which it is integrated are therefore not shown and will not be described in detail below.

Each input port 31 is capable of receiving frames of the first type and/or the second type.

Each output port 32 is capable of transmitting frames of the first type and/or the second type.

Configuration table 33 is used to determine frame processing rules within the end system 24A.

For this purpose, configuration table 33 is stored in a dedicated memory of end system 24A, and comprises a list of identification values and for each identification value, parameters for processing frames with that identification value. These processing parameters are then defined by each flow that may be transmitted or received by end system 24A.

According to an advantageous embodiment of the invention, the memory of end system 24A dedicated to the storage of the configuration table is of CAM type. In other words, this memory is implemented using CAM (Content Addressable Memory) technology, which means that it is content addressable.

According to this example, the memory of end system 24A is initialised with the list of identification values. This means, in particular, that each identification value has a memory address referring to a storage field containing the processing parameters corresponding to this identification value. This makes it possible to search for the identification parameters corresponding to a given identification value very quickly, or even almost instantaneously, compared to a traditional search in a list.

In one embodiment, the list of identification values is determined statically. This means that this list is determined, for example, at the design stage of the system and cannot be changed during its operation. It is therefore pre-determined processing of frames of each type.

In another embodiment, at least some of the identification values in this list are determined dynamically. In other words, these values can be deleted or added during the operation of system 20. In this case, these identification values relate only to second type flows. It should be noted that when a CAM is used, an address in this memory can also be added or deleted dynamically as a result of adding or deleting an identification value.

As for the identification values of the first type of frames, i.e. the identification values of the ARINC 664 P7 flows, these can only be defined statically in order to guarantee the determinism of the network 12.

For each identification value of the flows to be received by the end system 24A, the processing parameters are of the same nature and are notably independent of the protocol of the frames of the corresponding flow. In other words, for each identification value of the flows intended to be received by end system 24A, the processing parameters are advantageously composed of the same number of parameters, which are ordered in the same way and independently of the protocol of the corresponding flow.

Thus, these flow processing parameters intended to be received by the end system 24A, include for each identification value at least one identifier of an internal port or an internal transmission link to which each frame received by the system 24A is to be transmitted.

Advantageously, the parameters for processing the flows intended to be received by the end system 24A also include, for each identification value, a parameter indicating the need for redundancy management of each frame that has this identification value.

Advantageously, in a particular example of implementation of the invention, this parameter is "true" for each identification value corresponding to a flow of first type and "false" for each identification value corresponding to a flow of second type.

Redundancy management is in accordance with the requirements of the ARINC 664 P7 type protocol. In particular, in a manner known per se, the redundancy management of a frame comprises, upon transmission of this frame by the corresponding end system, the generation of several replicas of this frame and, upon reception by the corresponding end system, the comparison of all the replicas and, as a function of this comparison, the rejection of these replicas or the deletion of at least some of them in order to retain only the original frame. The replicas corresponding to the same frame can, for example, be determined by using a sequential number at the end of each frame. In the example of frames of the first type, this may correspond to the SN field shown in FIG. 3 in relation to frame 15.

Thus, advantageously according to the invention, the redundancy mechanism is applied to each frame of the first type and is not disturbed by the traffic of the second type frames.

Just like the parameters for processing the identification values of the flows intended to be received by the end system 24A, the parameters for processing the identification values of the flows intended to be transmitted by end system 24A are of the same nature and are in particular independent of the protocol of the corresponding flow frames. In other words, for each identification value of the flows intended to be sent by end system 24A, the processing parameters are advantageously composed of the same number of parameters, which are ordered in the same way and independently of the protocol of the corresponding flow.

For each flow identification value intended to be transmitted by the end system 24A, the processing parameters include at least one frame timing period of the corresponding flow and at least one output port 32 of the frames of that flow.

The timing period then defines a timing period for the frames of the flow corresponding to a minimum interval of transmission of two consecutive frames of the same flow.

For the first type of flow, the timing period is known as the Bandwidth Allocation Gap (BAG). This timing period makes it possible to define an authorised bandwidth for the corresponding flow.

In a first embodiment, timing periods are also associated with the second type of flow. In this case, the second type of flows are then said to be "BAGged" insofar as properties similar to those of the first type of flows are associated with these second type flows. In this case, it is therefore also possible to associate a predetermined bandwidth for each flow of the second type.

Figure 5:
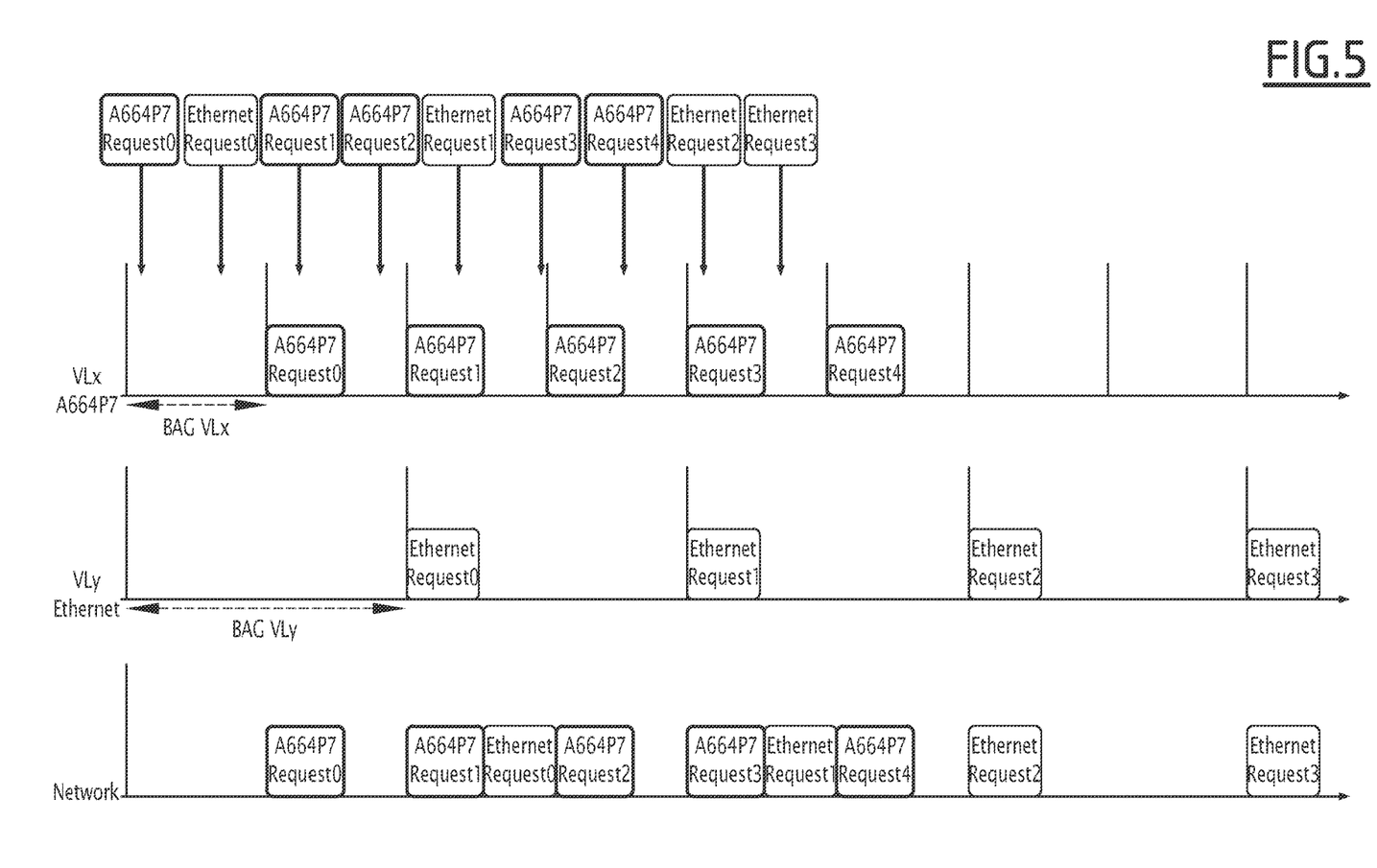
FIG. 5 is a schematic view of the bandwidth distribution implemented by the end system in FIG. 4, according to a first embodiment of the invention.

The transmission of frames according to this first embodiment through the same output port 32 is schematically illustrated in FIG. 5.

In particular, according to the example of this figure, a timing period BAGVLx is determined for a flow of first type and a timing period BAGVLy is determined for a flow of second type. The timing period BAGVLx is shown on the time axis VLx, and the timing period BAGVLy is shown on the time axis VLy.

These periods are determined according to the available bandwidth at the corresponding times.

Thus, when transmitting the first type frames denoted in FIG. 5 by "A664P7 REQUEST T0", . . . , "A664P7 REQUEST T4" and the second type frames denoted in FIG. 5 by "ETHERNET REQUEST T0", . . . , "ETHERNET REQUEST T3", these frames are transmitted according to their timing periods as illustrated on the NETWORK time axis. In addition, the transmission of the first type of frames takes priority over the transmission of the second type of frames, as explained in connection with switches 22A, . . . , 22N.

In a second embodiment, predetermined timing periods are not associated with second type flows. In this case, the corresponding values in configuration table 33 may be equal to a predetermined value (e.g. 0); which then means that no particular timing period is associated with the corresponding flow.

According to this embodiment, each output port 32 is configured to transmit each second type frame by filling the available bandwidth after transmission of the corresponding first type frames.

Figure 6:
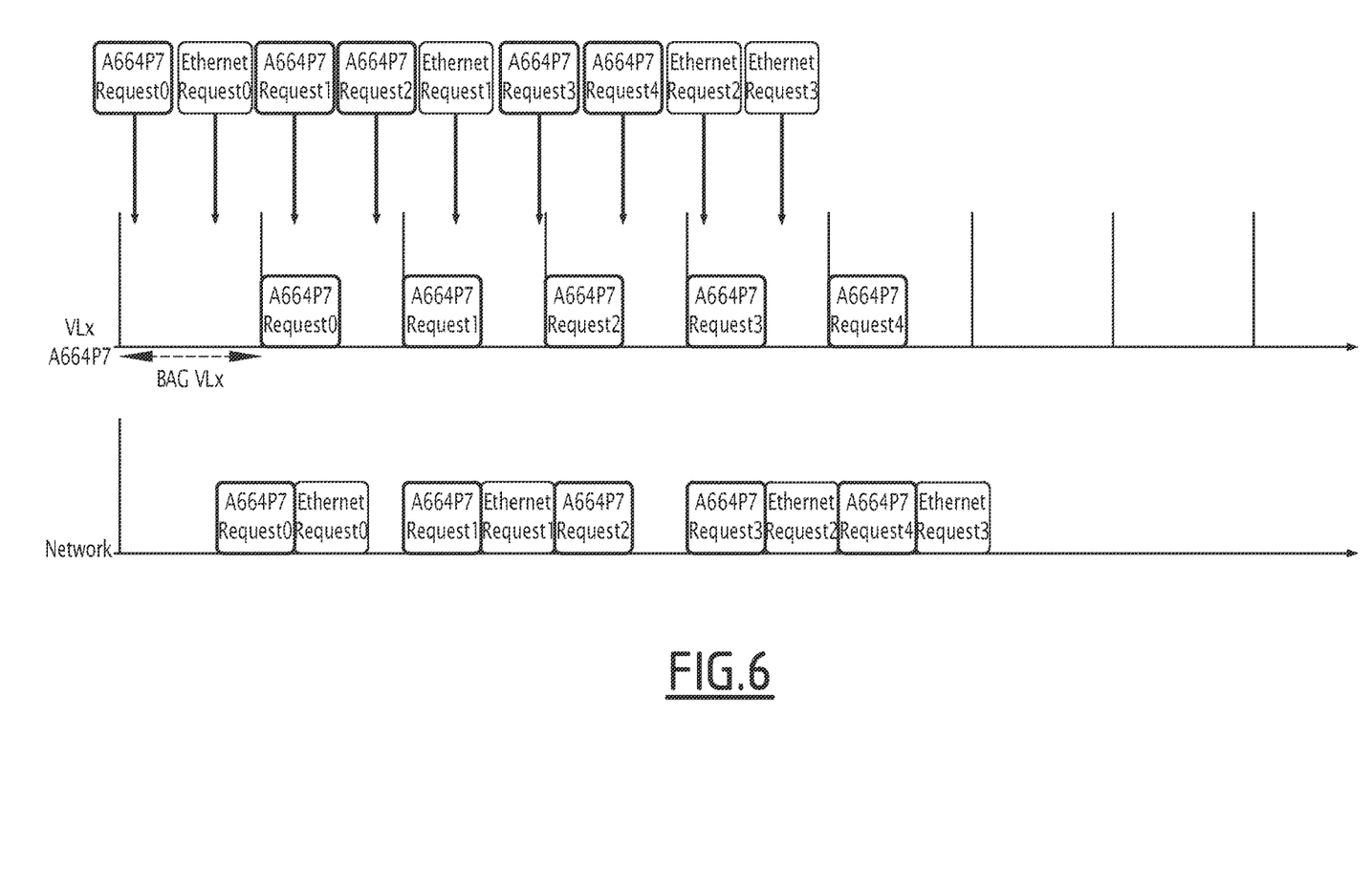
FIG. 6 is a schematic view of the bandwidth distribution implemented by the end system in FIG. 4, according to a second embodiment of the invention.

The transmission of frames according to this second embodiment through the same output port 32 is schematically illustrated in FIG. 6.

In particular, according to the example of this figure, a timing period BAGVLx is determined for a flow of the first type and is illustrated on the time axis VLx.

When transmitting frames of the first type denoted in FIG. 6 as "A664P7 REQUEST T0", . . . , "A664P7 REQUEST T4", these frames are transmitted according to their timing period as illustrated on the NETWORK time axis. As regards the second type of frames denoted by "ETHERNET REQUEST T0", . . . , "ETHERNET REQUEST T3", these are transmitted in the "gaps" formed between the transmissions of the frames by "A664P7 REQUEST T0", . . . , "A664P7 REQUEST T4", as can also be seen on the NETWORK time axis. Here, as in the previous case, frames of the first type are transmitted with priority over frames of the second type.

In a particular embodiment of the invention, only the parameters for processing the identification values of the flows to be received by the end system 24A are stored in the configuration table 33, together with these identification values. As for the processing parameters of the flows to be issued by the end system 24A, these are stored in a separate table or in any other available means.

The control means 34 controls the operation of each input port 31 and output port 32 and is, for example, in the form of a central unit connected to each of these ports, as shown in FIG. 4.

In another embodiment, the control and switching means 34 are distributed at least partially between the ports 31, 32 and thus allow local control of the operation of each of these ports.

Control means 34 also enables frames within end system 24A to be switched between each input port 31 and an internal port or link, and between such an internal port or link and an output port 32, in accordance with the corresponding flow processing parameters in the configuration table 33, as explained above.

Control means 34 also allows the implementation of redundancy management mechanisms as explained above.

It is therefore clear that the present invention has a number of advantages.

First of all, the invention allows the implementation of mixability of ARINC 664 P7 and IEEE 802 type networks using the same physical components, i.e. the same transmission means, the same switches and the same input and output ports.

This then allows for a considerable reduction in the size and weight of networks 12 and 14 on board aircraft 10.

Finally, the end systems are configured to process frames independently of their type, i.e. independently of the protocol of these frames. The operation of each end system can thus be substantially identical for each frame so that there is no need to distinguish between frames of different protocols. This then allows the operation of the end systems to be optimised.

The invention claimed is:

1. An end system for an avionics communication system, the avionics communication system further comprising a plurality of switches connected together to form one or more computer networks, the end system being configured to be connected to at least one of the switches to receive and/or transmit digital data in the form of frames through that switch;

each frame having an identification field and being of a first type or a second type, the identification field of each frame defining an identification value, the frames of the first type conforming to a protocol of an ARINC 664 P7 type and the frames of the second type conforming to a protocol of an IEEE 802 type, the set of frames of the first type having a same identification value forming a single flow of the first type and the set of frames of the second type having the same identification value forming a single flow of the second type;

wherein the end system comprises at least one input port capable of receiving frames, and a configuration table comprising for each identification value parameters for processing frames having that identification value;

wherein the end system is able to determine a processing protocol for each frame received via the input port exclusively from the processing parameters corresponding to the identification value of this frame in the configuration table, independently of the type of this frame;

wherein the end system further comprises at least one output port adapted to transmit frames of first type and/or second type; and wherein the end system is configured to transmit each second type frame at a timing period predefined by the identification value of that frame, frames of the first type being transmitted with priority over frames of the second type.

2. The end system according to claim 1, wherein the identification value is a destination address of the frame.

3. The end system according to claim 2, wherein the identification field of each frame corresponds to a MAC DEST field of this frame.

4. The end system according to claim 1, wherein the set of frame identification values of each type and the corresponding processing parameters are statically determined in the configuration table.

5. The end system according to claim 1, wherein for each identification value, the processing parameters include a parameter indicating a need for redundancy management of each frame that has this identification value.

6. The end system according to claim 1, wherein each timing period is defined by the processing parameters associated with the corresponding identification value.

7. The end system according to claim 1, configured to transmit each second type frame by filling available bandwidth after transmission of the corresponding first type frames.

8. An avionics communication system comprising at least two end systems and at least one switch connected to each of the end systems, each end system being according to claim 1.

9. The end system according to claim 1, wherein the end system is further configured to manage each frame within the end system received by an input port by:

determining the identification value of the received frame;

determining the processing parameters in the configuration table corresponding to the identification value of the received frame; and validating the received frame in accordance with the determined corresponding processing parameters in the configuration table.

* * * * *